S. L. CLEMENS.
Scrap-Books.
No. 140,245. Patented June 24, 1873.
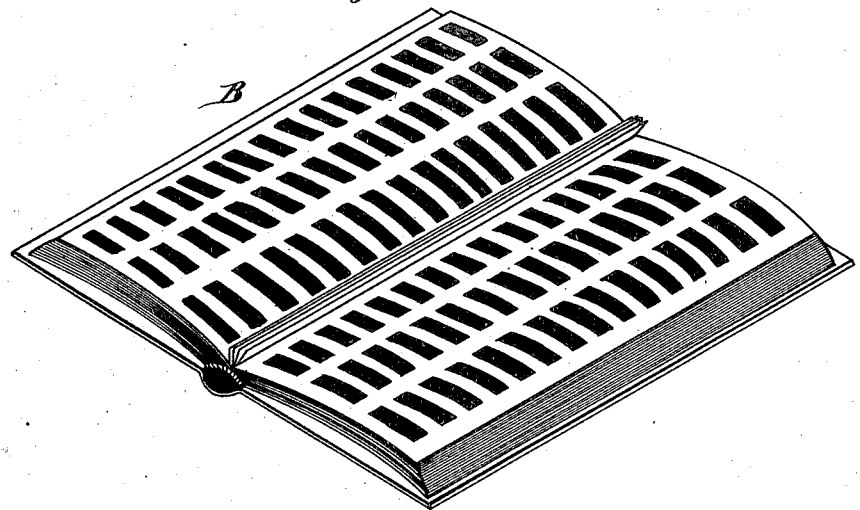
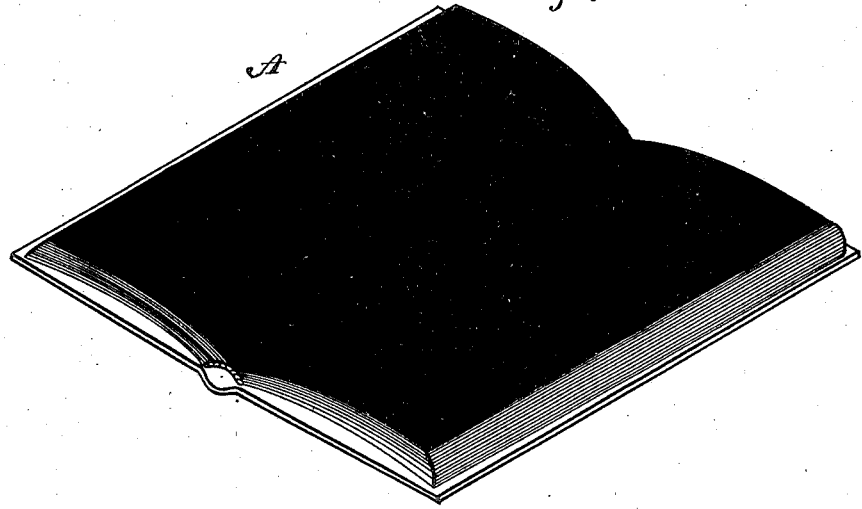
Witnesses:
Franck L. Ourand
C. L. Evert
Inventor.
Samuel L. Clemens
per Hawks & Mason
Attorneys.

UNITED STATES PATENT OFFICE.

SAMUEL L. CLEMENS, OF HARTFORD, CONNECTICUT.

IMPROVEMENT IN SCRAP-BOOKS.

Specification forming part of Letters Patent No. 140,245, dated June 24, 1873; application filed May 7, 1873.

*To all whom it may concern:*

Be it known that I, SAMUEL L. CLEMENS, of Hartford, in the county of Hartford and in the State of Connecticut, have invented certain new and useful Improvements in Scrap-Book; and do hereby declare that the following is a full, clear, and exact description thereof, reference being had to the accompanying drawings, and to the letters of reference marked thereon, making a part of this specification.

The nature of my invention consists in a self-pasting scrap-book, as will be hereinafter more fully set forth.

In order to enable others skilled in the art to which my invention appertains to make and use the same, I will now proceed to describe its construction and operation, referring to the annexed drawing, which represents perspective views of two of my scrap-books.

A and B represent two scrap-books of any desired dimensions, and made, as far as material, binding, &c., is concerned, in any of the known and usual ways. The leaves of which the book A is composed are entirely covered, on one or both sides, with mucilage or other suitable adhesive substance, while the leaves of which the book B is composed have the mucilage or adhesive substance applied only at intervals, as represented in Fig. 1.

In either case the scrap-book is, so to say, self-pasting, as it is only necessary to moisten so much of the leaf as will contain the piece to be pasted in, and place such piece thereon, when it will stick to the leaf.

I do not wish to be understood as claiming a book-cover having short guards coated with an adhesive substance, as I am aware that such is not new.

Having thus fully described my invention, what I claim as new, and desire to secure by Letters Patent, is—

As an article of manufacture, a scrap-book, the surfaces of the leaves whereof are coated with a suitable adhesive substance covering the whole or parts of the entire surface, all as set forth.

In testimony that I claim the foregoing I have hereunto set my hand this 15th day of April, 1873.

SAML. L. CLEMENS.

Witnesses:
A. N. MARR,
ESAU HALL.